UNITED STATES PATENT OFFICE.

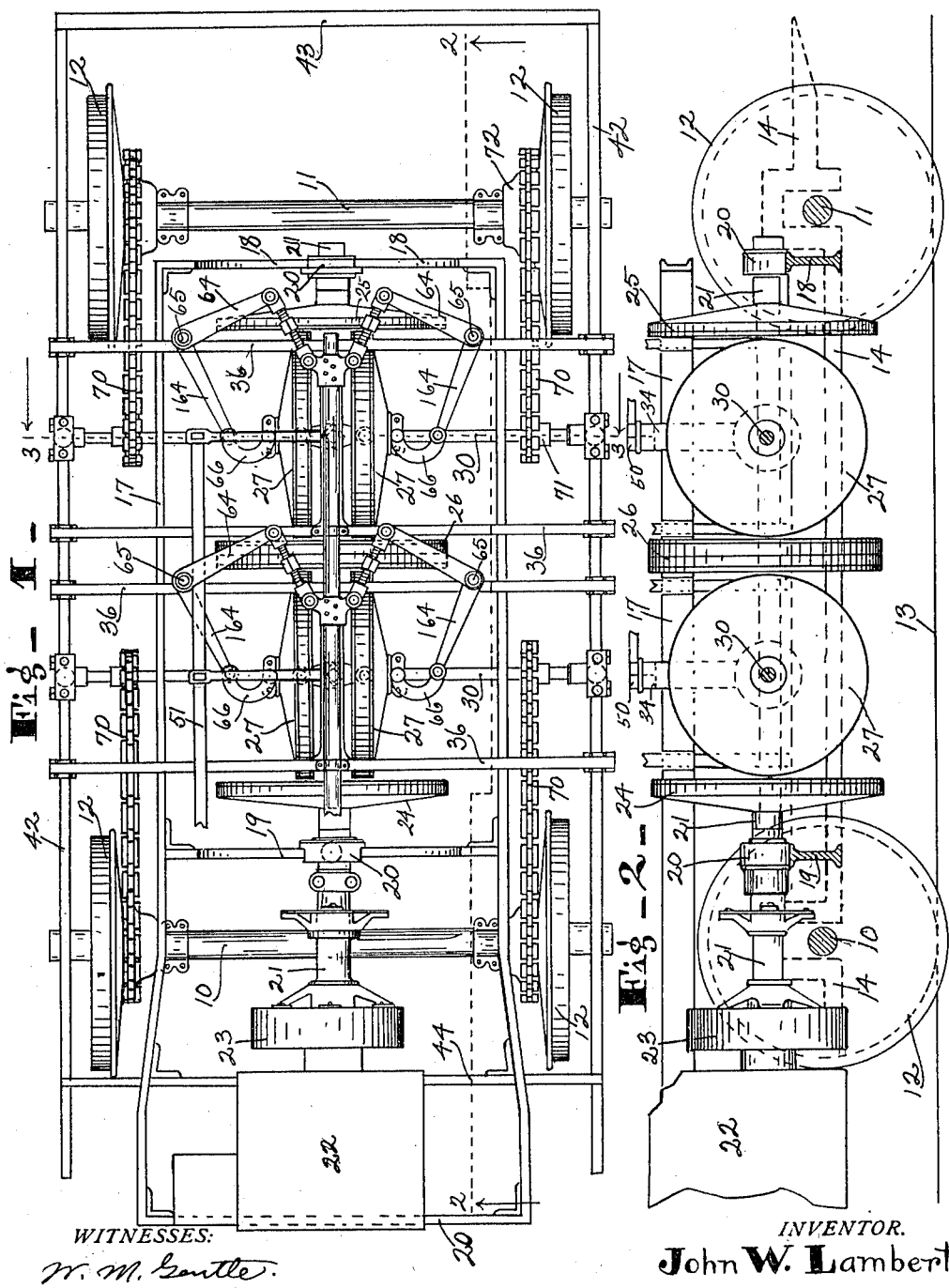

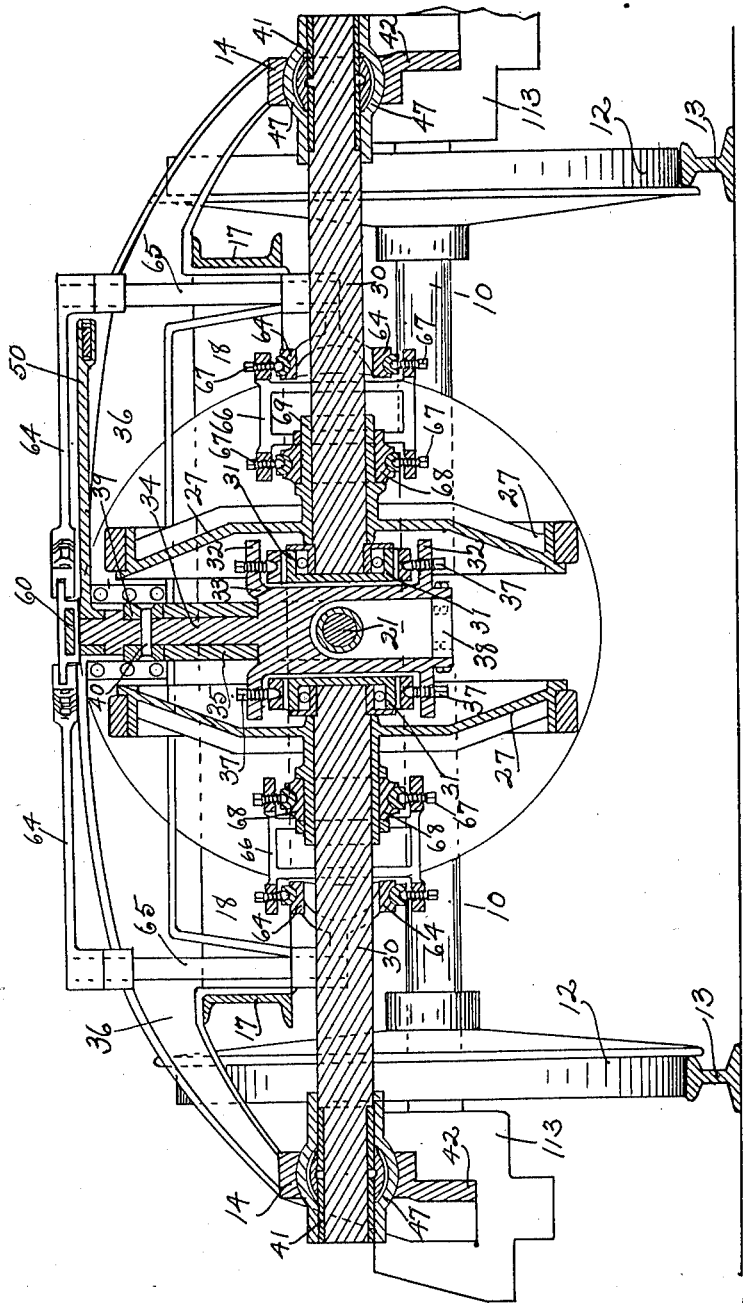

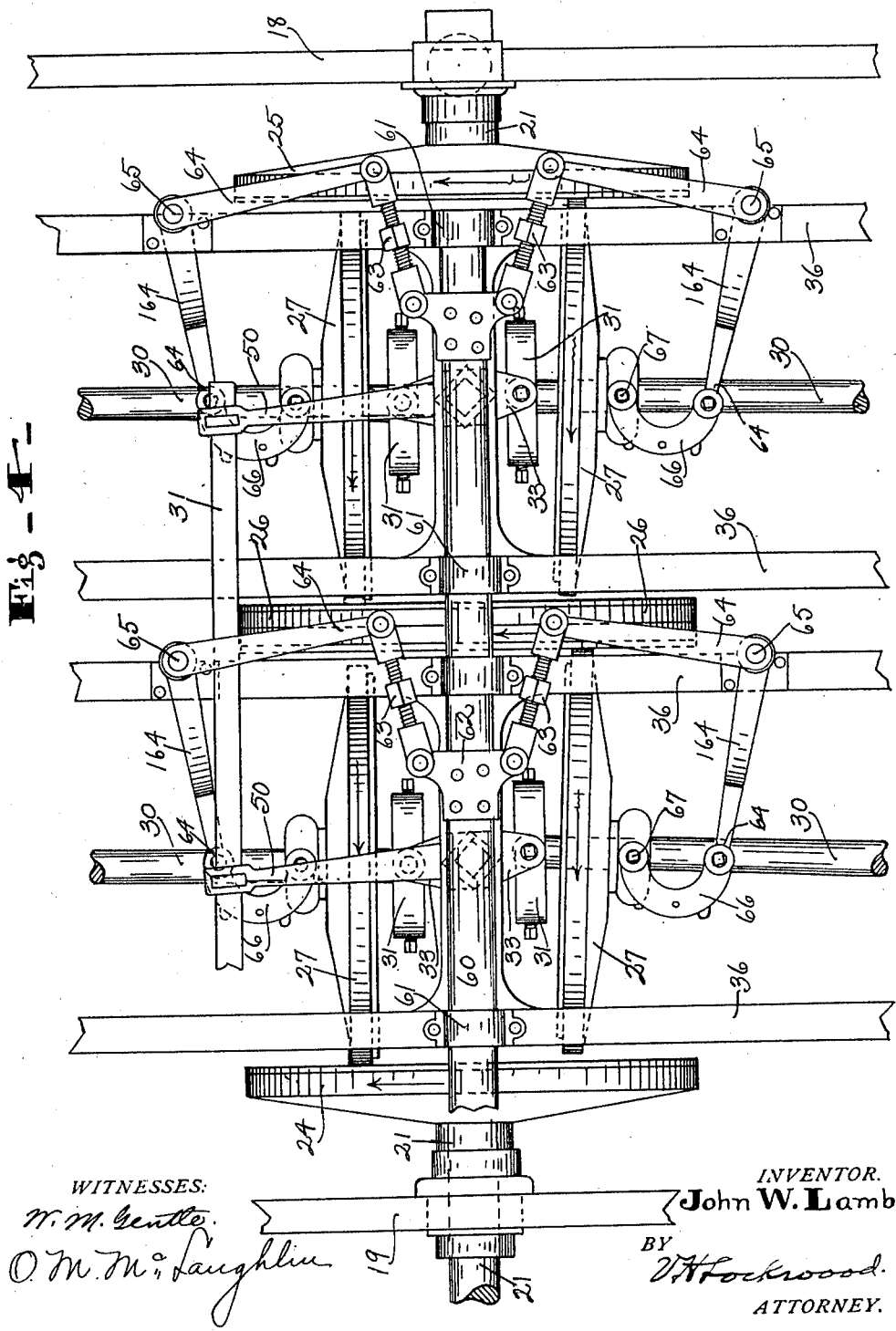

JOHN W. LAMBERT, OF ANDERSON, INDIANA, ASSIGNOR TO THE BUCKEYE MANUFACTURING COMPANY, OF ANDERSON, INDIANA, A CORPORATION OF INDIANA.

FRICTION TRANSMISSION MECHANISM.

1,061,759. Specification of Letters Patent. Patented May 13, 1913.

Application filed May 31, 1910. Serial No. 564,151.

*To all whom it may concern:*

Be it known that I, JOHN W. LAMBERT, of Anderson, county of Madison, and State of Indiana, have invented a certain new and useful Friction Transmission Mechanism; and I do hereby declare that the following is a full, clear, and exact description thereof, reference being had to the accompanying drawings.

The object of this invention is to provide a practical friction transmission mechanism adapted to operate street cars, interurban cars, or other railway or very heavy cars of any kind.

The invention as herein shown has been worked out with particular reference to interurban cars and street cars and has been operated successfully therein.

This invention enables street, interurban and other railway cars to be driven by gasolene engines practically and successfully. Because of the tremendous weight and momentum of such cars, gear drives would have difficulty, as the gears would too frequently be stripped or injured.

The problem of adapting friction transmission mechanism for the practical propulsion of such heavy cars has required several novel features for its solution. One difficulty has been to provide a practical friction transmission mechanism that would be capable of transmitting sufficient power for so large a car. That has been solved chiefly by devising a coöperative plurality of systems and groups of friction transmission means with means for operating them as a unit, whereby all of said systems and all parts coöperate and distribute the strain among them so as to obtain together a great amount of frictional engagement of parts, whereby considerable power can be transmitted and yet there will still remain a possibility of slippage in emergency, sufficient, at least, to save the machinery. Along with the foregoing is the further feature of mounting the plurality of friction drive systems between the axles of the car and separately connecting a friction drive system up with each axle and having means for operating the total driving means as a unit. Also there is the further feature of a single means for controlling the operation of the plurality of friction drive systems employed in a single car. Another problem in driving such cars with gasolene engines is the provision of practical power transmission means which will enable the speed to be easily changed without either injury to the machinery or unbearable noise while changing the speed. Still another problem has been the provision of means for mounting friction transmission under the body of a street car without building the bottom of the body of the car higher than has been customary. Another problem was to get all this friction transmission mechanism in such compact form that it could be conveniently mounted in connection with an ordinary street car and at the same time arrange it so that the direction of movement of the car could be readily reversed. This last feature is accomplished by shifting the same friction wheels which propel the car forwardly.

With the foregoing features I have been enabled to propel interurban cars by individual motors at an extremely low cost, lower than the cost of propelling the same by electricity, and the troubles of power plants and lines, whereby all the cars are stopped, are avoided.

The nature of the invention will be understood from the accompanying drawings and the following description and claims:

In the drawings Figure 1 is a plan view of the running gears of a railway car with some parts broken away and with the usual truck frame, bolsters and springs omitted. Fig. 2 is a vertical section on the line 2—2 of Fig. 1 showing the friction drive mechanism and one side of the truck frame, in side elevation, but with the other parts omitted for the sake of clearness. Fig. 3 is a transverse vertical section on the line 3—3 of Fig. 1, centrally through one pair of friction wheels and their associated parts, but omitting the usual truck frame, bolsters and springs for the sake of clearance. Fig. 4 is a plan view of the central portion of Fig. 1 with portions broken away and with the parts shown in their operated positions.

In detail there appears in the drawings herein the forward axle 10 and the rear axle 11 carrying railway wheels 12 running on railway rails 13. Upon the axles there is mounted the usual truck frame 14, which, however, does not appear in any of the drawings excepting in Fig. 3, nor do the springs and bolsters appear, as the construction of the wheels, axles, truck frame, springs and bolsters may be of the usual character and these parts have been largely omitted for the sake of clearness of the parts more directly concerned in the invention.

The side beams 42 of a rectangular frame are mounted upon the springs and bolsters (not shown) of the truck frame in the usual manner. This frame consists of side frames 42, end frames 43 and 44 and intermediate transverse arched beams 36. Another rectangular frame is provided for carrying the power driving mechanism. It has side beams 17 and cross beams 18, 19 and 20 and is mounted to the other frame by the bars 17 being secured to the arched cross beams 36. Hence it may be said that there are three frames in the whole make-up of the car; namely, the truck frame which supports the springs not shown, the first-mentioned frame, beams 17, 18, 19 and 20 which are supported by said springs and, therefore, by the truck frame, and this third frame formed of beams 42, 43, 44 and 36 which frame is supported upon the second or intermediate frame mentioned.

The side beams 17, as seen in Fig. 3, and cross beam 20 of said frame are horizontal, while the cross beams 18 and 19 are curved downwardly between their ends, as indicated in Figs. 2 and 3, to support bearings 120 for the central longitudinal extending driving shaft 21, which extends from the engine 22 and carries a fly wheel 23. The driving shaft 21 carries two end friction wheels 24 and 25 and an intermediate double-faced friction wheel 26, which are fixed thereon so that they constitute practically two pairs of parallel driving friction wheels, and between each pair of driving friction wheels a pair of driven friction wheels 27 are interposed at a right-angle to the driving wheels, which latter extend transversely of the device, while the former extend longitudinally of the device. The driving friction wheels receive the power from the engine and through the driven friction wheels transmit it to the driven means.

The driven friction wheels 27 are mounted as shown in Fig. 3, each slidably upon a transverse driven shaft 30, but so as to cause the rotation of the shaft. Since the friction wheels 27 of each pair are arranged face to face, the shafts 30, therefore, are in alinement with each other and their inner ends are mounted in vertically disposed bearings 31, which are in turn mounted between the horizontal flanges 32 of a rocking frame 33 on the lower end of the vertical shaft 34, which is mounted in a vertical bearing 35 secured to a cross frame beam 36. The bearings 31 are connected with the flanges 32 by pins 37. The frame 33 is divided yokelike and fits very loosely astride the drive shaft 21, and the lower extensions thereof are connected by a bar 38. The shaft 34 has a bushing 39 secured to it or around it by a bolt 40 and that bushing rests upon the bearing 35.

The outer ends of the shafts 30 have universal bearings 41 in the side frame beams 42. The mounting of the shafts 30 which carry the longitudinal friction disks 27 is such as to enable the inner ends thereof to be rocked to and fro and thus move said friction disks toward or away from the transverse friction disks 24, 25 and 26 on each side of the disks 27. This rocking movement is caused by the oscillation of the central supporting frame 33 and the shaft 34 which carries it. This oscillation is caused by the laterally extending levers 50, one for each pair of longitudinal friction disks, and which at their inner ends are secured rigidly to the tops of the shafts 34 and at their outer ends are connected with the longitudinally movable bar 51, which runs to the end of the car or motorman's vestibule, and there means is provided for causing the longitudinal movement of said bar 51 so as to oscillate the frames 33, which carry the inner ends of the shafts 30 and thus move the disks 27 of each pair in opposite directions, as indicated in Fig. 4, thus causing one longitudinal disk to bear against one of the cross disks and the other longitudinal disk to bear against the other cross disk of each pair. Thus a forward or left-hand movement of the bar 51 from the position shown in Fig. 1 to the position shown in Fig. 4 will shift the longitudinal friction wheels 27 so as to cause a forward movement of the car, but a reversal of the bar 51 or movement thereof to the right will cause a reversal of the relative positions of the friction wheels 27 of each pair and their engagements with the transverse friction wheels, and thus propel the car rearwardly. An intermediate position of the bar 51, as shown in Fig. 1, disengages all the longitudinal friction wheels from the transverse friction wheels and thus stops the car. Increased friction between the driving wheels can be obtained by increasing the pull or push on bar 51, as the case may be, when at its extreme positions.

To regulate speed the horizontally disposed disks must be radially movable toward and away from the centers of the transverse disks. This is effected by longitudinal movement of the bar 60, which is parallel with the bar 51 and runs to the vestibule of the car, and there means is provided for causing such longitudinal movement. It is slidable in the bracket 61 secured upon the arched cross beams 36. Plates 62 are secured to said bar 60 and to said plates connecting rods 63 are pivoted which extend to the inwardly extending arms 64 of bell crank levers formed of said arms, rods 65 fulcrumed to the arched cross beams 36 and arms 164. The connecting rods 63 are formed so as to be adjustable in length. The other ends or arms 164 of the bell crank levers are yoked and pivoted to frames 66, see Fig. 3, which are curved almost semicircular, see Fig. 4, and are pivoted at 67 to a collar 68 on the hub 69 of the friction wheel 27, see Fig. 3. Since said hub and wheel are slidable on the shaft 30, a movement of the bars 60 to the left from the position shown in Fig. 4 will move the longitudinal friction wheels 27 away from the centers of the transverse wheels, and an opposite movement of the bar 60 will force said wheels 27 toward each other into the position shown in Fig. 3. Of course, the farther said wheels 27 are from the centers of the transverse friction wheels, the greater will be the speed of the car. Power is transmitted from each shaft 30 to the axles by the sprocket chains 70 which run over sprocket wheels on said shafts 30, and the sprocket wheels 71 on the axles. Thus power is transmitted to both axles and to both ends of each axle preferably, and from each of the four shafts 30 preferably, although ordinarily one forward and one rearward chain 70 would transmit sufficient power to propel the car. Thus it is seen that while a plurality of systems of friction transmission means are provided in the car the same operate as a unit and distribute the frictional engagement between many parts and transmit power to both the axles and thus make the transmission of so heavy a car by friction possible and practical. Also there is provided a single means for controlling the operation of the friction systems and a single means for changing the speed thereof, and all the driving friction wheels are secured on one driving shaft and all the driven friction wheels are simultaneously in driving engagement with the driving friction wheels, and the friction wheels are mounted so low that they project lower than the truck frame, and, therefore, a car body can be mounted on such running gear at substantially the same elevation as has been usual heretofore in connection with other driving means. It is also observed that by providing in each friction group a plurality of drive wheels with a plurality of driven wheels intermediate the drive wheels so mounted that they can be moved in opposite directions into frictional engagement with their respective drive wheels, both receive power at the same time and substantially the same degree and transmit it to both the axles and preferably from four shafts to four points on the axles, whereby the strains are well distributed.

By "system" of friction transmission means as used in the claims and elsewhere herein is meant a combination of parts or means capable of transmitting power from the driving shaft to a driven means. Thus one of the friction wheels 27, with the two adjacent transverse friction wheels and the shaft 30 on which the wheel 27 is mounted, is capable without any of the other friction wheels, of transmitting power from the driving shaft through the sprocket chain to the axle, and constitutes a "system" of friction transmission means. Hence four "systems" of friction transmission means are shown. But this is somewhat theoretical inasmuch as two systems of friction transmission means are arranged together so that they have parts in common. Thus the friction transmission systems in the left-hand group of Fig. 1 both use the same pair of transverse friction wheels, but otherwise the parts are capable of independent transmission of power.

There is still a larger grouping than the foregoing, that is, a pair of the transverse friction wheels with the intermediate pair of longitudinal friction wheels and their associated parts coöperate and in a sense constitute a group of systems independent of the other pair of longitudinal friction wheels and their associated transverse friction wheels, as either of those larger groups would in itself suffice to transmit power from the engine to an axle. But in this grouping as in the foregoing explanation of "system," there is a common element, namely, the double faced friction wheel 26. This use of elements or members in common in the systems and groups tends greatly to the desirable compactness of the construction. This analysis of the friction transmission mechanism is made for theoretical clearness of expression, although a single system and possibly a single group would not practically suffice to do the work here required.

I claim as my invention:

1. The combination of a frame, a driving shaft mounted in the frame, a plurality of driving friction wheels secured on said shaft, driven shafts extending laterally in opposite directions from said driving shaft, means for mounting said driven shafts so that their inner ends may have some lateral movement, means for giving the inner ends of said driven shafts such lateral movement in opposite directions, a driven friction wheel on each side of the driving shaft between said driving wheels and mounted on the inner end of said driven shafts so as to turn the same and be slidable thereon, a bell crank lever mounted in the frame for each driven shaft and connected at one end therewith, and a single means for operating all of said bell crank levers whereby said driven wheels will be moved toward or away from the centers of said driving wheels.

2. The combination of a frame, a driving shaft mounted in the frame, a plurality of driving friction wheels secured on said shaft, driven shafts extending laterally in opposite directions from said driving shaft, means for mounting said driven shafts so that their inner ends may have some lateral movement, means for giving the inner ends of said driven shafts such lateral movement in opposite directions, a driven friction wheel on each side of the driving shaft between said driving wheels and mounted on the inner end of said driven shafts so as to turn the same and be slidable thereon, a bell crank lever mounted in the frame for each driven shaft and connected at one end therewith, and a longitudinally slidable plate connected with the other arms of all of said bell crank levers for simultaneously moving them and sliding all the driven friction wheels toward or away from the centers of the driving friction wheels.

In witness whereof, I have hereunto affixed my signature in the presence of the witnesses herein named.

JOHN W. LAMBERT.

Witnesses:
GEO. A. NEWTON,
H. L. WOODRUFF.

---

Copies of this patent may be obtained for five cents each, by addressing the "Commissioner of Patents, Washington, D. C."